(12) United States Patent
Zani et al.

(10) Patent No.: US 6,418,511 B1
(45) Date of Patent: Jul. 9, 2002

(54) LARGE CAPACITY DATA STORAGE SYSTEMS USING REDUNDANT BUSES

(75) Inventors: Mark A. Zani, Derry, NH (US); Michael Gadarowski, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/222,645

(22) Filed: Dec. 30, 1998

(51) Int. Cl.[7] ............................................. G06F 13/00
(52) U.S. Cl. .................... 711/114; 711/111; 711/112; 711/113; 710/128; 710/129; 710/130; 710/131
(58) Field of Search ............................. 711/4, 111–114, 711/157, 204; 710/126, 25, 110, 128–131

(56) References Cited

U.S. PATENT DOCUMENTS 4,479,179 A * 10/1984 Dinwiddie, Jr. ............. 710/25
5,206,939 A * 4/1993 Yanai et al. .................. 711/4
5,809,560 A * 9/1998 Schneider .................. 711/204
5,987,550 A * 11/1999 Shagam ..................... 710/119

* cited by examiner

*Primary Examiner*—Than Nguyen
(74) *Attorney, Agent, or Firm*—Daly, Crowley & Mofford, LLP

(57) ABSTRACT

A data storage system wherein a host computer is coupled to a bank of disk drives through a system interface. The system interface includes a memory having a high address memory section and a low address memory section. A plurality of directors controls data transfer between the host computer and the bank of disk drives as such data passes through the memory. A pair of high address busses, comprising a plurality of bus high address bus segments, is in communication with the high address memory section and a pair of low address busses, comprising a plurality of low address bus segments, is in communication with the low address memory section. Each one of the directors is in communication with one of the pair of high address busses and one of the pair of low address busses.

10 Claims, 8 Drawing Sheets

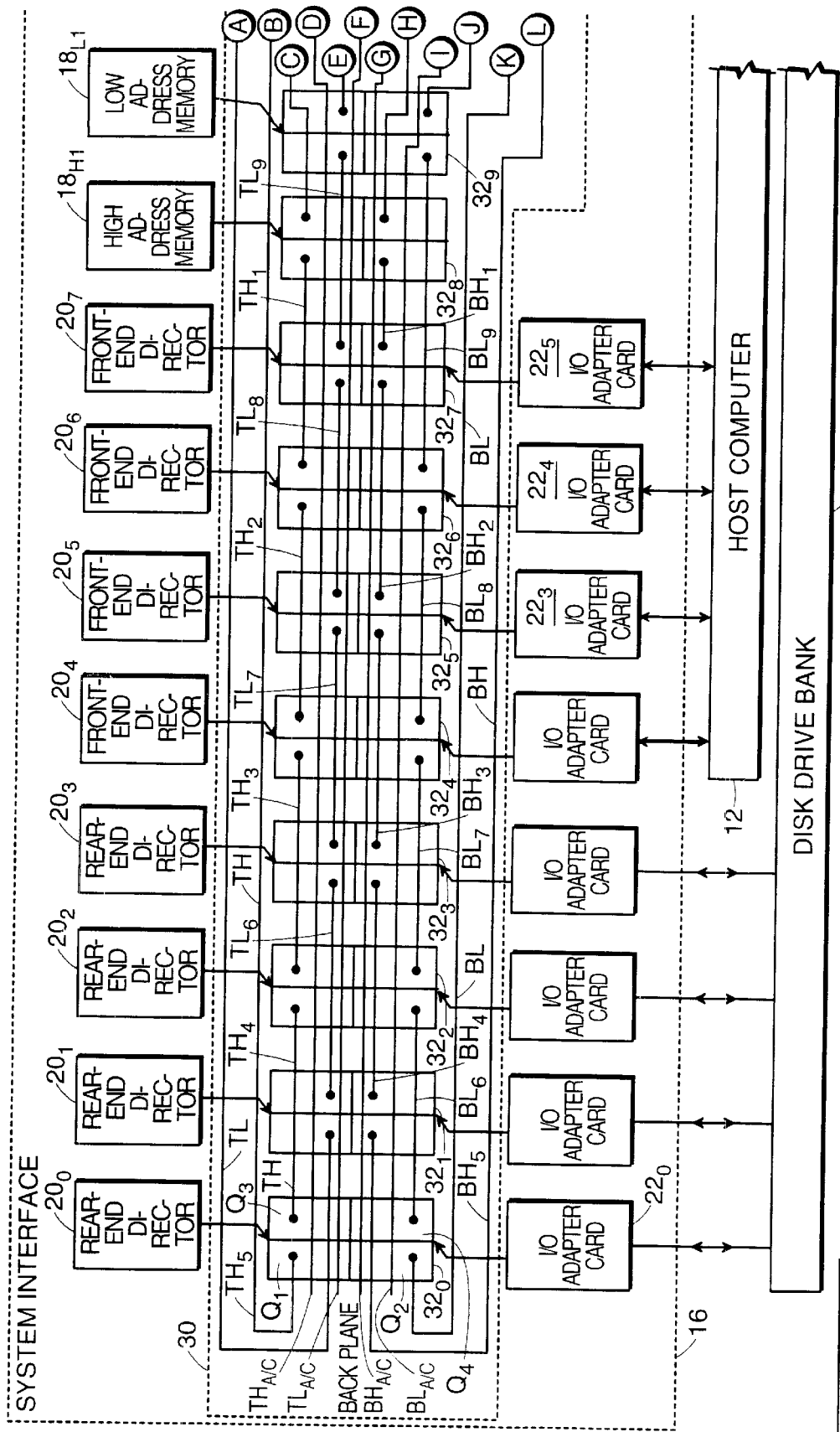

LARGE CAPACITY DATA STORAGE SYSTEMS USING REDUNDANT BUSES

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host (i.e., mainframe or open system) computer systems require large capacity data storage systems. These large host computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the host computer system are coupled together through an interface. The interface includes CPU, or "front end", controllers (or directors) and "back end" disk controllers (or directors). The interface operates the controllers (or directors) in such a way that they are transparent to the computer. That is, data is stored in, and retrieved from, the bank of disk drives in such a way that the host computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers (or directors) and disk controllers (or directors), addressable cache memories. The cache memory is a semiconductor memory and is provided to rapidly store data from the host computer system before storage in the disk drives, and, on the other hand, store data from the disk drives prior to being sent to the host computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set of the disk controllers is connected to one bus and another set of the disk controllers is connected to the other bus. Likewise, one set of the CPU controllers is connected to one bus and another set of the CPU controllers is connected to the other bus. The cache memories are connected to both buses. Each one of the buses provides data, address and control information.

Thus, the use of two buses provides a degree of redundancy to protect against a total system failure in the event that the controllers, or disk drives connected to one bus fail. Further, the use of two busses increases the data transfer bandwidth of the system compared to a system having a single bus.

SUMMARY OF THE INVENTION

In accordance with the present invention, a data storage system is provided wherein a host computer is coupled to a bank of disk drives through a system interface. The system interface includes a memory having a high address memory section and a low address memory section. A plurality of directors controls data transfer between the host computer and the bank of disk drives as such data passes through the memory. A pair of high address busses, comprising a plurality of bus high address bus segments, is in communication with the high address memory section and a pair of low address busses, comprising a plurality of low address bus segments, is in communication with the low address memory section. Each one of the directors is in communication with one of the pair of high address busses and one of the pair of low address busses.

In accordance with another feature of the invention, a data storage system is provided wherein a host computer is coupled to a bank of disk drives through a system interface. The system interface includes: a memory; a bus, comprising a plurality of bus segments; and a data loop comprising a plurality of directors in communication with the memory through the plurality of bus segments. The plurality of directors control data transfer between the host computer and the bank of disk drives as such data passes through the memory via the data loop.

In accordance with another feature of the invention, a data storage system is provided wherein a host computer is coupled to a bank of disk drives through a system interface. The system interface includes a memory having a high address memory section and a low address memory section. The interface also includes: a pair of high address busses, comprising a plurality of bus high address bus segments, in communication with the high address memory section; a pair of low address busses, comprising a plurality of low address bus segments, is in communication with the low address memory section; and a plurality of data loops, comprising a plurality of directors in communication with the memory through the plurality of high address and low address bus segments. The directors control data transfer between the host computer and the bank of disk drives as such data passes through the memory via the data loops.

In accordance with another feature of the invention, a data storage system is provided wherein a host computer is coupled to a bank of disk drives through a system interface. The system interface includes: a memory having a high address memory section and a low address memory section; a high address bus, comprising a plurality of bus high address bus segments, in communication with the high address memory section; a low address bus, comprising a plurality of low address bus segments, is in communication with the low address memory section; and a pair of data loops. A first one of such pair of data loops comprises a first plurality of directors in communication with the memory through the plurality of high address bus segments for controlling data transfer between the host computer and the bank of disk drives as such data passes through the high address memory section. A second plurality of directors is in communication with the memory through the plurality of low address bus segments for controlling data transfer between the host computer and the bank of disk drives as such data passes through the low address memory section.

In accordance with another feature of the invention, the system interface includes a printed circuit board having a plurality of electrical connectors arranged in a linear array and electrically connected to the busses. The electrical connectors are adapted to receive the directors and the memory and electrically interconnect the directors and memory received therein to the busses. A first set of the directors is electrically connected to a first pair of the busses and a second set of directors interleaved with the first set is electrically connected to a second pair of the busses.

In accordance with still another feature of the invention, each one of the electrical connectors has three sections. For the electrical connectors which receive the first set of directors, such electrical connectors have a first one of the three section connected to a first one of the busses in the first pair of busses and a second one of the three sections connected to a second one of the busses in the first pair of busses. For the second set of directors, the electrical connectors have the first one of the three section connected to a first one of the busses in the second pair of busses and the second one of the three sections connected to a second one of the busses in the second pair of busses.

In accordance with another feature of the invention, for the electrical connectors which receive memory sections, one such electrical connector has the first one of the three section connected to the first one of the busses in the first pair of busses and a third one of the three sections connected to the second one of the busses in the second pair of busses. Another one of the electrical connectors connected to a memory section has the first one of the three section connected to the second one of the busses in the first pair of busses and the third one of the three sections connected to the second one of the busses in the second pair of busses.

BRIEF DESCRIPTION OF THE DRAWING

These and other features of the invention will become more readily apparent from the following detailed description when read together with the accompanying drawings, in which.

DESCRIPTION OF THE PREFERRED EMBODIMENTS

Figure 1:
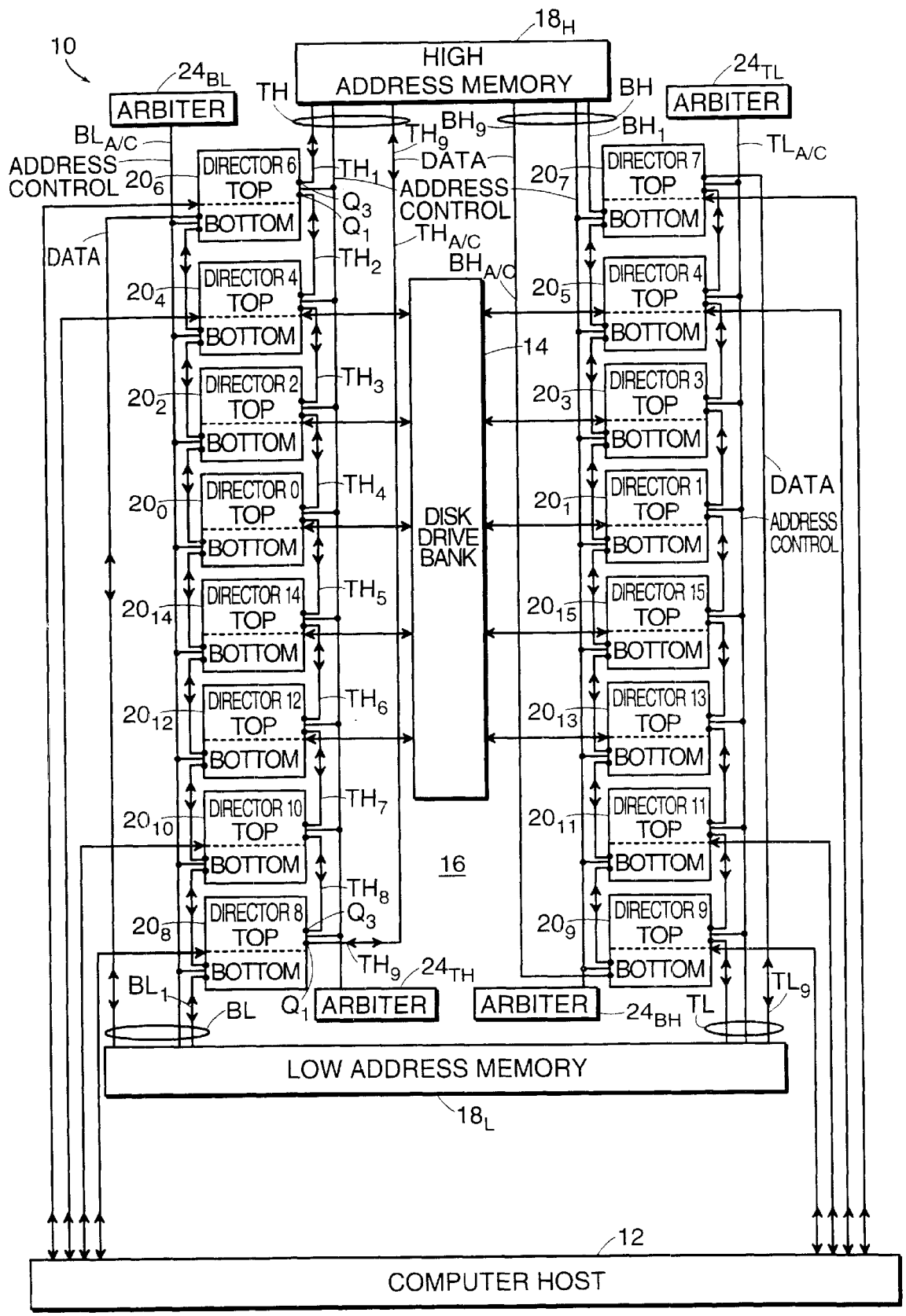
FIG. 1 is a block diagram of a data storage system according to the invention.

Referring now to FIG. 1, a data storage system 10 is shown wherein a host computer 12 is coupled to a bank 14 of disk drives through a system interface 16. The system interface 16 includes a cache memory having a high address memory section 18H and a low address memory section 18L. A plurality of directors $20_0$–$20_{15}$ is provided for controlling data transfer between the host computer 12 and the bank 14 of disk drives as such data passes through the cache memory 18H, 18L. A pair of high address bi-directional data busses TH, BH comprising a plurality of high address bi-directional data bus segments, $TH_1$–$TH_9$ and $BH_1$–$BH_9$, respectfully, is electrically connected to the high address memory section 18H to transfer data. A pair of low address bi-directional data busses TL, BL, comprising a plurality of low address bi-directional data bus segments $TL_1$–$TL_8$ and $BL_1$–$BL_8$, respectfully, is electrically connected to the low address memory section 18L to transfer data. The cache memory 18H, 18L has a plurality of storage location addresses. Here, the storage locations having the higher addresses are in the high address memory section 18H and the storage locations having the lower addresses are in the low address memory section 18L. It should be noted that each one of the directors $20_0$–$20_{15}$ is electrically connected to (i.e., in communication with) one of the pair of high address busses TH, BH and one of the pair of low address busses TL, BL. Thus, each one of the directors $20_0$–$20_{15}$ is able to address all locations in the entire cache memory (i.e., to both the high address memory section 18H and the low address memory section 18L) and is therefore able to store data in and retrieve data from any storage location in the entire cache memory 18H, 18L. More particularly, a rear-end portion of the directors, here directors $20_0$–$20_3$ and $20_{12}$–$20_{15}$, is electrically connected to the bank 14 of disk drives and a front-end portion of the directors, here directors $20_4$–$20_{11}$, is electrically connected to the host computer 12.

The interface 16 includes four address and control busses, $TH_{A/C}$, $TL_{A/C}$, $BH_{A/C}$, and $BL_{A/C}$ connected to the directors $20_0$–$20_{15}$ for providing memory address and control signals to provide the address and control signals to the directors $20_0$–$20_{15}$ and memory sections 18H, 18L to effectuate the desired data transfer. Each one of the four address and control busses, $TH_{A/C}$, $TL_{A/C}$, $BH_{A/C}$, and $BL_{A/C}$ terminates in a bus arbiter $24_{TH}$; $24_{TL}$; $24_{BH}$; $24_{BL}$, respectively. It should be noted that additional bus arbiters, not shown, may terminate the other end of the four address and control busses, $TH_{A/C}$, $TL_{A/C}$, $BH_{A/C}$, and $BL_{A/C}$ as described in a co-pending patent application entitled "Data Storage System", inventors Daniel Castel, et al., filed the same day as this application, assigned to the same asignee as this application, the entire subject matter thereof being incorporated herein by reference.

In operation, when the host computer 12 wishes to store data, the host computer 12 issues a write request to one of the front-end directors $20_4$–$20_{11}$ to perform a write command. One of the front-end directors $20_4$–$20_{11}$ replies to the request and asks the host computer 12 for the data. After the request has passed to the requesting one of the front-end directors $20_4$–$20_{11}$, the director determines the size of the data and reserves space in the cache memory 18 to store the request. The front-end director then produces control signals on either a high address memory bus (TH or BH) or a low address memory bus (TL, BL) connected to such front-end director depending on the location in the cache memory 18 allocated to store the data and enable the transfer to the cache memory 18. The host computer 12 then transfers the data to the front-end director. The front-end director then advises the host computer 12 that the transfer is complete. The front-end director looks up in a Table, not shown, stored in the cache memory 18 to determine which one of the rear-end directors $20_0$–$20_3$ and $20_{12-2015}$ is to handle this request. The Table maps the host computer 12 address into an address in the bank 14 of disk drives. The front-end director then puts a notification in a "mail box" (not shown and stored in the cache memory 18) for the rear-end director which is to handle the request, the amount of the data and the disk address for the data. Other rear-end directors poll the cache memory 18 when they are idle to check their "mail boxes". If the polled "mail box" indicates a transfer is to be made, the rear-end director processes the request, addresses the disk drive in the bank, reads the data from the cache memory and writes it into the addresses of a disk drive in the bank 14. When data is to be read from the disk drive to the host computer 12 the system operates in a reciprocal manner. Arbitration among the busses TH, TL, BH, BL is provided by the arbiters $24_{TH}$ $24_{TL}$, $24_{BH}$ $24_{BL}$. It is noted that the transfer of data to the memory is point-to-point, i.e., from one director to another director in a daisy chain, or concatenated arrangement, the directors being connected by a relatively short bus segment. Thus, because the data must be driven only a relatively short distance from one director to the next director, the data may be transferred between such directors at a relatively high rate.

Figure 2:
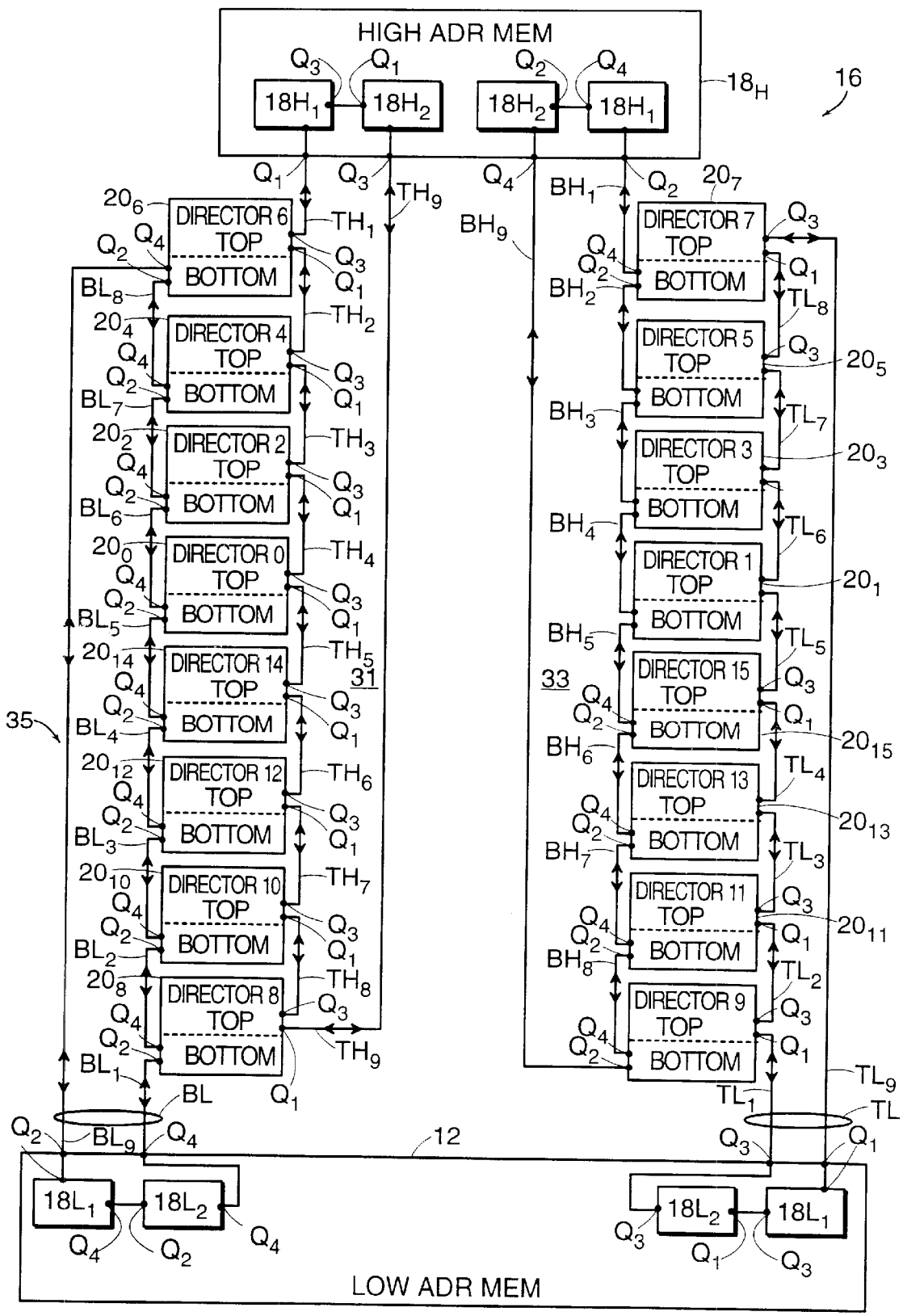
FIG. 2 is a block diagram showing data flow connections through the data storage system of FIG. 1.

More particularly, the system interface 16 includes four data loops, or rings, shown more clearly in FIG. 2. A first one of such data loops, (i.e., a top high, TH, data loop 31) includes directors $20_0$, $20_2$, $20_4$, $20_6$, $20_8$, $20_{10}$, $20_{12}$, and $20_{14}$ in communication with the high address memory section 18H through high address bi-directional data bus segments $TH_1$–$TH_9$, as indicated. It is noted that the high address memory section 18H includes two high address memories, 18H1 and 18H2. The two high address memories 18H1 and 18H2 are interconnected as indicated and in am manner to be described in more detail hereinafter.

A second one of such data loops, (i.e., a bottom high, BH, data loop 33) includes directors $20_1$, $20_3$, $20_5$, $20_7$, $20_9$, $20_{11}$, $20_{13}$, and $20_{15}$ in communication with the high address memory section 18H through high address bi-directional data bus segments $BH_1$–$BH_9$, as indicated. A third one of such data loops, (i.e., a bottom low, BL, data loop 35) includes directors $20_0$, $20_2$, $20_4$, $20_6$, $20_8$, $20_{10}$, $20_{12}$, and $20_{14}$ in communication with the low address memory section 18L through low address bi-directional data bus segments $BL_1$–$BL_9$, as indicated. It is noted that, like high address memory section 18H, the low address memory section 18L includes two low address memories, 18L1 and 18L2. The two low address memories 18L1 and 18L2 are interconnected as indicated. The fourth one of such data loops, (i.e., a top low, TL, data loop 37) includes directors $20_1$, $20_3$, $20_5$, $20_7$, $20_9$, $20_{11}$, $20_{13}$, and $20_{15}$ in communication with the low address memory section 18L through top low address bi-directional data bus segments $TL_1$–$TL_9$, as indicated.

Figure 3B:
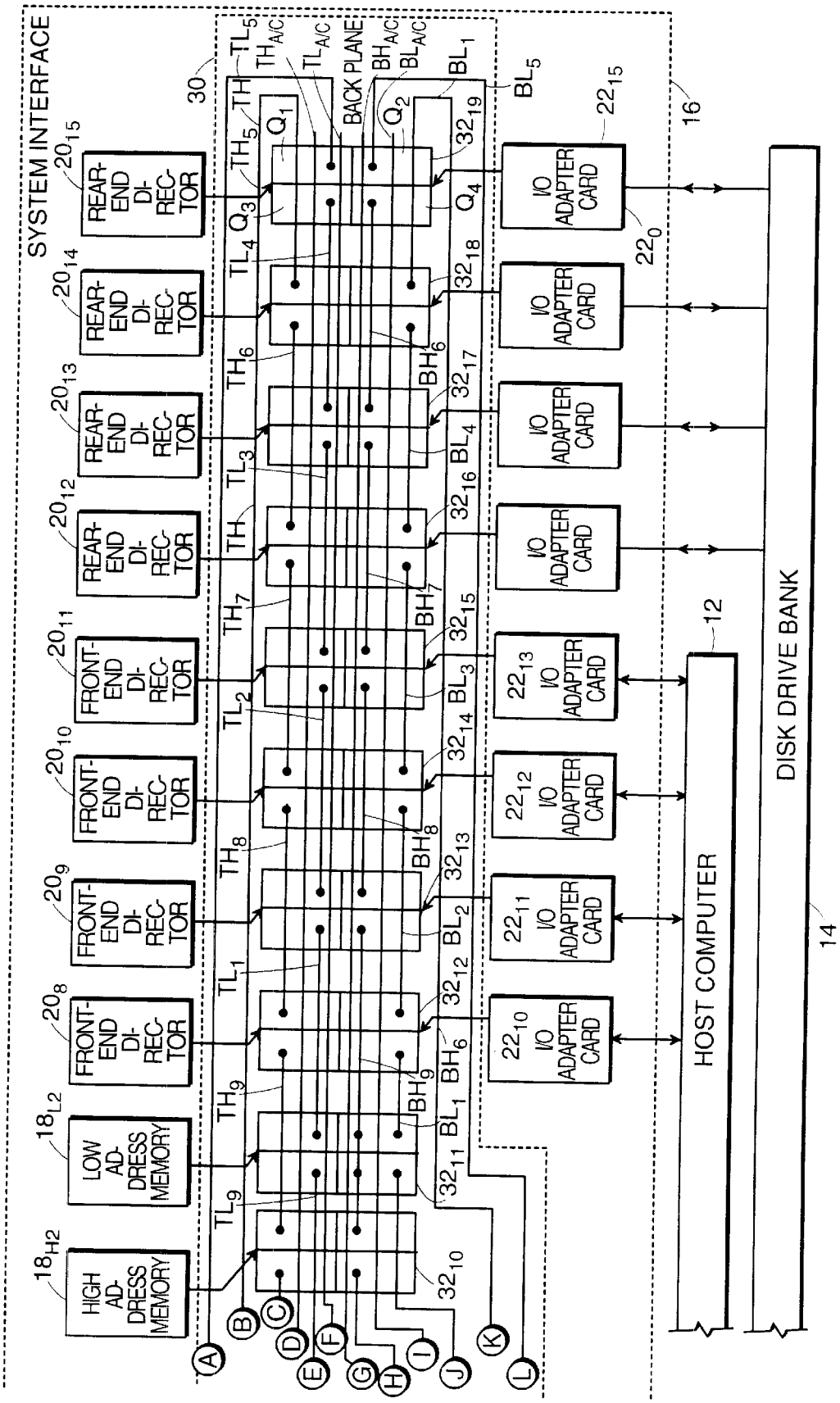
FIG. 3 is a diagram showing backplane interconnections used in the system of FIG. 1.

More particularly, and referring also to FIG. 3, the system interface 16 includes a backplane printed circuit board 30 having a plurality of, here 20, electrical connectors $32_0$–$32_{19}$, or slots, arranged successively and uniformly spaced in a linear array. The electrical connectors $32_0$–$32_{19}$ are connected selectively to the busses TH, TL, BH, BL, such selective electrical connections being indicated by the "dot" (•) in FIG. 3. Each one of the electrical connectors $32_0$–$32_7$ and $32_{12}$–$32_{19}$ is adapted to receive a corresponding one of the directors $20_0$–$20_7$ and $20_0$–$20_7$, respectively. Electrical connectors $32_8$ and $32_{10}$ are adapted to receive each of two high address memory section 18H memory printed circuit boards 18H1, 18H2 which together provide the high address memory section 18H. Electrical connectors $32_9$ and $32_{11}$ are adapted to receive each of two low address memory section 18L memory printed circuit boards, 18L1, 18L2 which together provide the low address memory section 18L. It is noted that the four address and control busses, $TH_{A/C}$, $TL_{A/C}$, $BH_{A/C}$, and $BL_{A/C}$ are connected to the connectors as shown more clearly in FIG. 5.

Referring to FIG. 3, is also noted that alternating ones of the directors, (i.e, directors $20_0$, $20_2$, $20_4$, $20_6$, $20_8$, $20_{10}$, $20_{12}$, and $20_{14}$), are electrically connected to one of the high address memory busses, here bus TH and to one of the low address memory busses, here bus BL, while the directors interleaved with such alternating ones of the directors (i.e., directors $20_1$, $20_3$, $20_5$, $20_7$, $20_9$, $20_{11}$, $20_{13}$, and $20_{15}$), are electrically connected to the other one of the high address memory busses, here bus BH and to the other one of the low address memory busses, here bus TL.

Each one of the electrical connectors $32_0$–$32_{19}$ is identical in construction. It is noted that because directors $20_0$–$20_{15}$ are received in one side of the backplane 30 and input/output I/O adapter cards $22_0$–$22_{15}$ (FIG. 1) are received on the other side of the backplane 30, the "backplane" may be regarded as a "midplane" printed circuit board. That is, the "backplane" has printed circuit boards (i.e, an I/O adapter cards $22_0$–$22_{15}$ and director cards $20_0$–$20_{15}$ (or memory card 18H, 18L) plugged into opposite sides of it, as described in the above-reference co-pending patent application). Here, the electrical connectors $32_0$–$32_{18}$ are a model VHDM manufactured by Teradyne, Boston, Mass., and has a plurality of electrically conductive pins 36 therein which pass through the backplane 30 for electrical connection to the I/O adapter cards $22_0$–$22_{15}$ and a director cards $20_0$–$20_{15}$ (or memory card 18) plugged into opposite ends of the pins 36.

Figure 4:
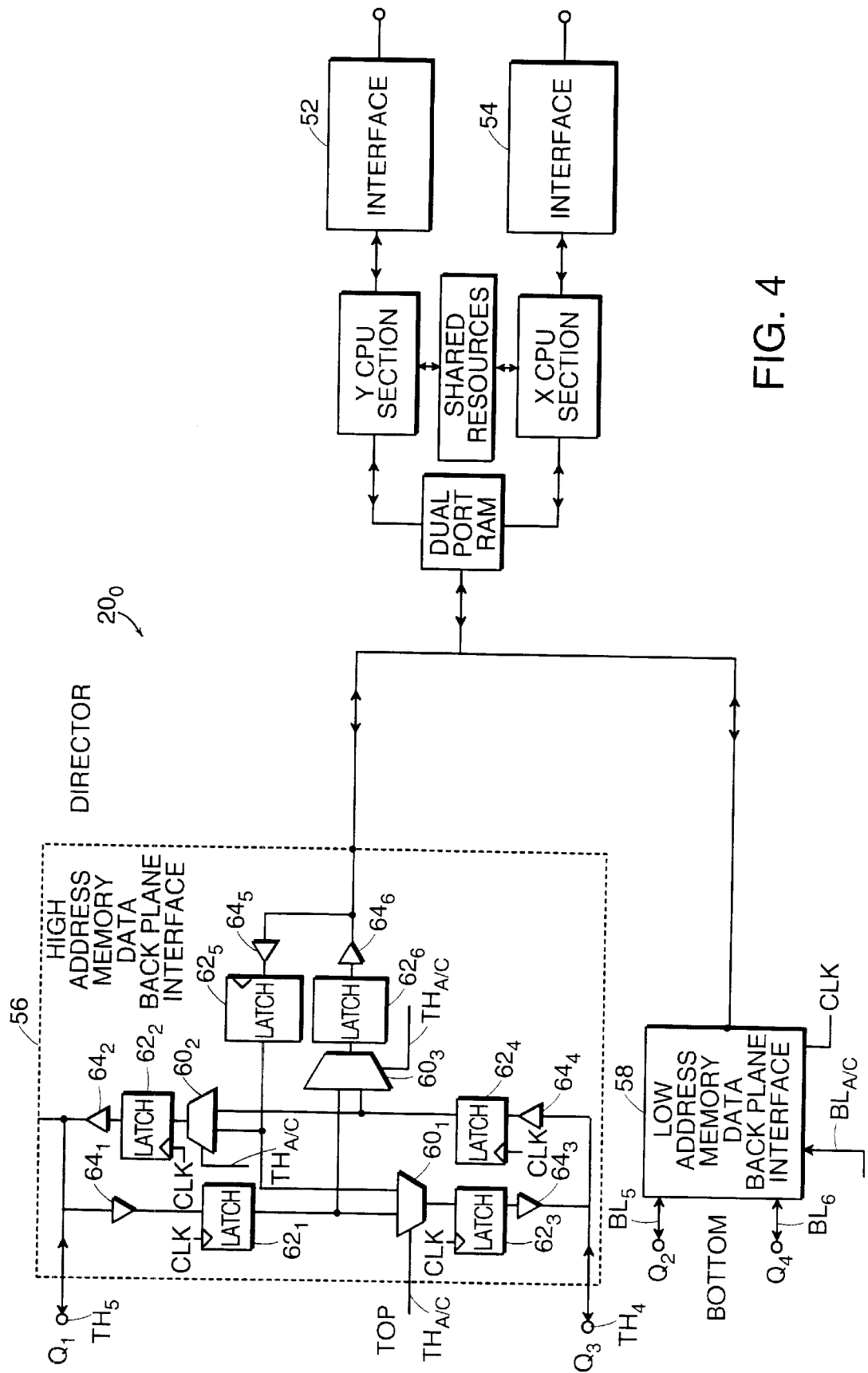
FIG. 4 is a block diagram of an exemplary director used in the system of FIG. 1.

Each one of the rear-end portion of the directors $20_0$–$20_3$ is identical in construction, an exemplary one thereof, here rear-end director $20_0$ being shown in FIG. 4 to include a pair of central processing sections, CPU X and CPU Y, a dual port random access memory (RAM), and shared resources (Flash memories, etc,) arranged as shown, coupled to the bank 14 of disk drives (FIG. 1) through I/O adapter card $22_0$ (FIG. 1) via an I/O upper backplane section interface 52 and I/O lower backplane section interface 54, as indicated and to a high address memory bus, here TH, and low address memory bus, here BL, via high address memory and low address memory data backplane interface sections 56, 58 respectively. More particularly, the dual port RAM is coupled to the bus segments $TH_4$ and $TH_5$ via high address memory data backplane interface sections 56 using pins in quadrants $Q_3$ and $Q_1$ (FIG. 3), respectively, of the connector into which director $20_0$ is plugged. In like manner, the dual port RAM is coupled to the bus segments $BL_5$ and $BL_6$ via low address memory data backplane interface sections 58 using pins in quadrants $Q_2$ and $Q_4$, respectively, of the connector into which director $20_0$ is plugged. Each one of the high address memory and low address memory data backplane interface sections 56, 58 is identical in construction. An exemplary one thereof, here interface 58 is shown in detail and is a three port bi-directional switch. A pair of the three ports, here ports $Q_1$ and $Q_3$ connected to bus TH (segments $TH_5$, $TH_4$, respectively) are, as noted above, connected to quadrants $Q_1$ and $Q_3$, respectively, of the connected into which the director $20_0$ is plugged. It is noted that the other one of the interfaces 58 in the director $20_0$ has a pair of the three ports, here ports $Q_2$ and $Q_4$ connected to bus BL (segments $BL_5$, $BL_4$, respectively) via quadrants $Q_2$ and $Q_4$, respectively, of the connected into which the director is plugged. The third port of each of the interfaces 56, 58 is coupled to the dual port RAM. Each one of the interfaces 56, 58 includes three selectors $60_1$–$60_3$, six latches $62_1$–$62_6$ and six drivers $64_1$–$64_6$ arranged as shown for exemplary interface 56. Each of the latches $62_1$–$62_6$ is fed clock pulses on line CLK, such clock pulses being provided concurrently to each of the directors $20_0$–$20_{15}$. Thus, in response to such clock pulses, data at the output of one of the selectors $60_1$, $60_2$ and $60_3$ will become latched into one of the latches $62_3$, $62_2$ and $62_6$, respectively. In like manner, data at the output of one of the drivers $64_1$, $64_4$ and $64_5$ will become latched into one of the latches $62_1$, $62_4$ and $62_5$, respectively. Each one of the selectors $60_1$, $60_2$ and $60_3$ is controlled by control signals fed thereto by the bus arbiter $24_{BL}$ via address and control bus $TH_{A/C}$. Thus, data at port $Q_1$ may, under the control of the arbiter $24_{TH}$, pass to port $Q_3$ after two clock pulses via driver $64_1$, latch $62_1$, selector $60_1$, latch $62_3$, and driver $64_3$. Alternatively, data at port $Q_1$ may, under the control of the arbiter $24_{TH}$, pass to the dual port RAM after two clock pulses via driver $64_1$, latch $62_1$, selector $60_3$, latch $62_6$, and driver $64_6$. In like manner, data at port $Q_3$ may, under the control of the arbiter $24_{BL}$, pass to port $Q_1$ after two clock pulses via driver $64_4$, latch $62_4$, selector $60_2$, latch $62_2$, and driver $64_2$. Alternatively, data at port $Q_3$ may, under the control of the arbiter $24_{BL}$, pass to the dual port RAM after two clock pulses via driver $64_4$, latch $62_4$, selector $60_3$, latch $62_6$, and driver $64_6$. Still alternatively, data at the output of dual port RAM may, under the control of the arbiter $24_{TH}$, pass to the port $Q_1$ after two clock pulses via driver $64_5$, latch $62_5$, selector $60_2$, latch $62_2$, and driver $64_2$. Likewise, data at the output of dual port RAM may, under the control of the arbiter $24_{BL}$, pass to the port $Q_3$ after two clock pulses via driver $64_5$, latch $62_5$, selector $60_1$, latch $62_3$, and driver $64_3$.

Each one of the front-end portion of the directors $20_4$–$20_{11}$ also includes, like the rear-end portion of the directors, a pair of central processing sections, CPU X and CPU Y, a dual port random access memory (RAM), and shared resources (Flash memories, etc,) coupled to the host computer 12 (FIG. 1) through I/O adapter cards (FIG. 1) as described in the above referenced co-pending patent application. The front-end directors are coupled to the high address memory bus, and low address memory bus via high address memory and low address memory data backplane interface sections equivalent to the interfaces 56, 58 respectively, described above for the rear-end directors.

Figure 5:
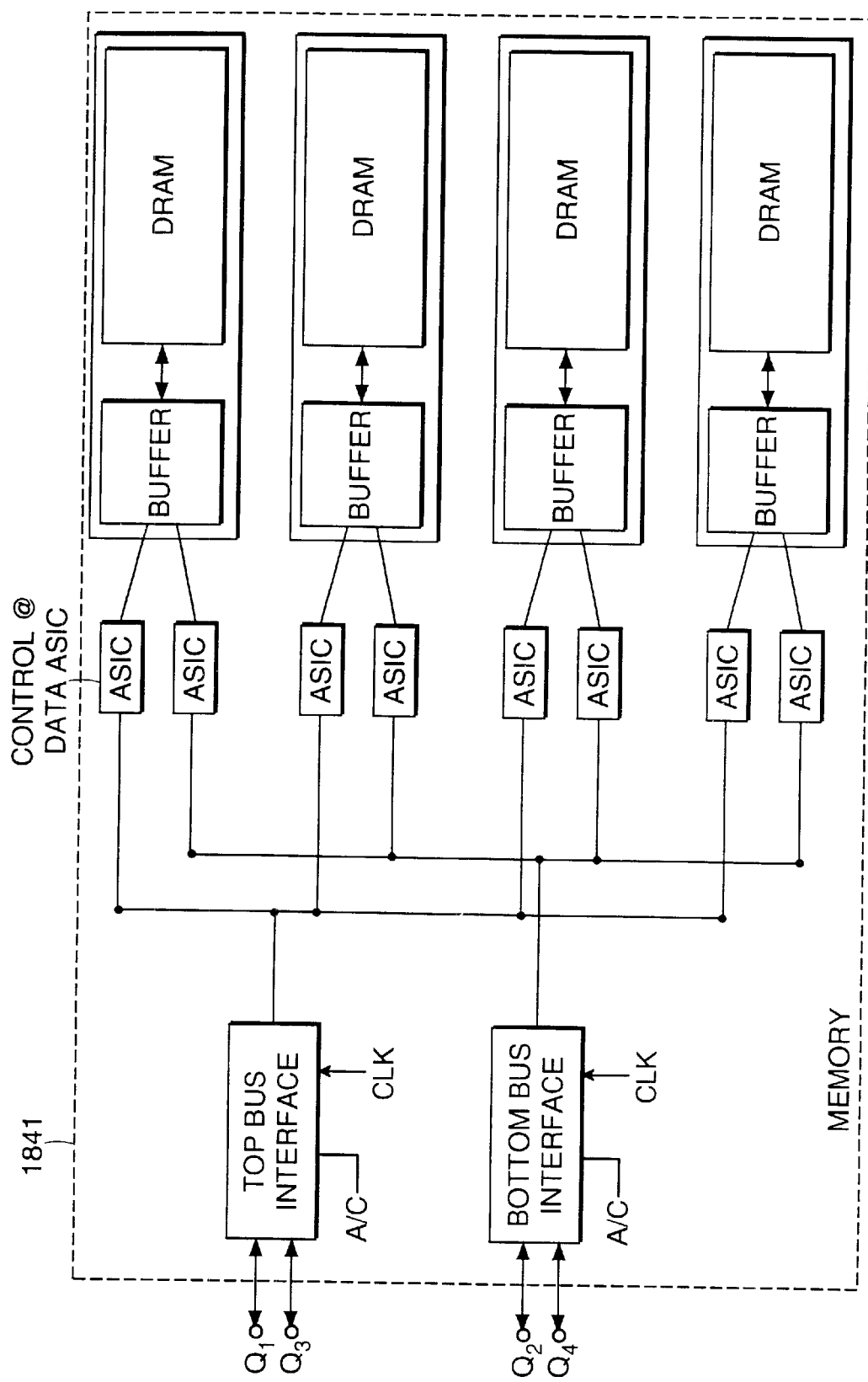
FIG. 5 is a block diagram of an exemplary memory used in the system of FIG. 1.

An exemplary one of the memory boards 18H1, 18H2, 18L1, and 18L2, here 18H1, is shown in FIG. 5 to include a plurality of here four DRAM sections coupled to the top and bottom busses though bus interfaces and ASIC control logics, as indicated. The bus interfaces are equivalent to the interfaces 56, 58 described above in FIG. 4 in connection with the rear-end directors. Thus, each one of the boards has four ports $Q_1$, $Q_2$, $Q_3$ and $Q_4$, as indicated and interconnected as shown in FIG. 2.

Referring again to FIGS. 1 and 2, as noted above, a plurality of bus arbiters $24_{TH}$, $24_{TL}$, $24_{BL}$, $24_{BH}$ is provided. Requests for one of the busses TH, TL, BH, BL are made by the eight directors connected to such one of the busses. Thus, for exemplary bus BL, requests for bus BL may be made by the eight directors $20_0$, $20_2$, $20_4$, $20_6$, $20_8$, $20_{10}$, $201_2$ and $20_{14}$ connected to such bus BL. Each one of the arbiters $24_{TH}$, $24_{TL}$, $24_{BL}$, $24_{BH}$ is identical in construction and is adapted to respond to the priority codes of the directors coupled thereto and assign access to such bus in accordance with a predetermined criteria, to be described.

Considering an exemplary transfer of data from the disk drive bank 14 (FIG. 1) to the host computer 12 where rear-end director $20_{14}$ receives such data from the disk drive bank 14, such data may, as determined by the arbiters $24_{TH}$, $24_{TL}$, $24_{BH}$, $24_{BL}$, pass to, for example, the high address memory section 18H serially through directors $20_{14}$, $20_0$, $20_2$, $20_4$ and $20_6$ via data bus segments $TH_5$, $TH_4$, $TH_3$, $TH_2$, $TH_1$. More particularly, the data passes through a portion of a high address memory data loop made up of directors $20_0$, $20_2$, $20_4$, $20_6$ and bus segments, $TH_5$, $TH_4$, $TH_3$, $TH_2$, and $Th_1$. It should be noted that while such data is being transferred through the portion of the high address memory data loop made up of directors $20_0$, $20_2$, $20_4$, $20_6$, data may be transferred from director $20_{12}$ to another portion of the high address memory section 18H via another portion of such loop; e.g., through a portion of the high address memory data loop made up of directors $20_{12}$, $20_{10}$, and $20_8$ via segments $TH_7$, $TH_8$, and $TH_9$. As noted above, the transfer of data on the backplane 30 is through the backplane interfaces described above in connection with FIG. 4 in the directors and is under the control of the arbiter and the clock pulses fed to such backplane interfaces.

For example, considering directors $20_0$, $20_2$, $20_4$, $20_6$, $20_8$, $20_{10}$, $20_{12}$, and $20_{14}$, the arbiter can determine the path to memory in accordance with the following Table:

| Director being fed Data | Shortest Path to Memory | Alternative Path to Memory if Shortest Path is Occupied |
|---|---|---|
| $20_0$ | $20_0$-$20_2$-$20_4$-$20_6$ | $20_0$-$20_{14}$-$20_{12}$-$20_{10}$-$20_8$ |
| $20_2$ | $20_2$-$20_4$-$20_6$ | $20_2$-$20_0$-$20_{14}$-$20_{12}$-$20_{10}$-$20_8$ |
| $20_4$ | $20_4$-$20_6$ | $20_4$-$20_2$-$20_0$-$20_{14}$-$20_{12}$-$20_{10}$-$20_8$ |
| $20_6$ | $20_6$ | $20_6$-$20_4$-$20_2$-$20_0$-$20_{14}$-$20_{12}$-$20_{10}$-$20_8$ |
| $20_8$ | $20_8$ | $20_8$-$20_{10}$-$20_{12}$-$20_{14}$-$20_0$-$20_2$-$20_4$-$20_6$ |
| $20_{10}$ | $20_{10}$-$20_8$ | $20_{10}$-$20_{12}$-$20_{14}$-$20_0$-$20_2$-$20_4$-$20_6$ |
| $20_{12}$ | $20_{12}$-$20_{10}$-$20_8$ | $20_{12}$-$20_{14}$-$20_0$-$20_2$-$20_4$-$20_6$ |
| $20_{14}$ | $20_{14}$-$20_{12}$-$20_{10}$-$20_8$ | $20_{14}$-$20_0$-$20_2$-$20_4$-$20_6$ |

An equivalent Table is used by the arbiter for directors $20_1$, $20_3$, $20_5$, $20_7$, $20_9$, $20_{11}$, $20_{13}$ and $20_{15}$.

It should also be noted that the arbiter can route data to memory through a path other than the shortest path if there is a fault in the shortest path. The fault can be detected using a time-out criteria, as when the memory is advise that a data transfer is to take place and such transfer does not occur for a time duration greater that a predetermined time duration in excess of the expected time duration for such transfer. Thus, it should also be noted that there is redundancy in that there are always a second path from a director to a memory if one path has a fault. That is, there are always two ways around a loop for redundancy.

Figure 6:
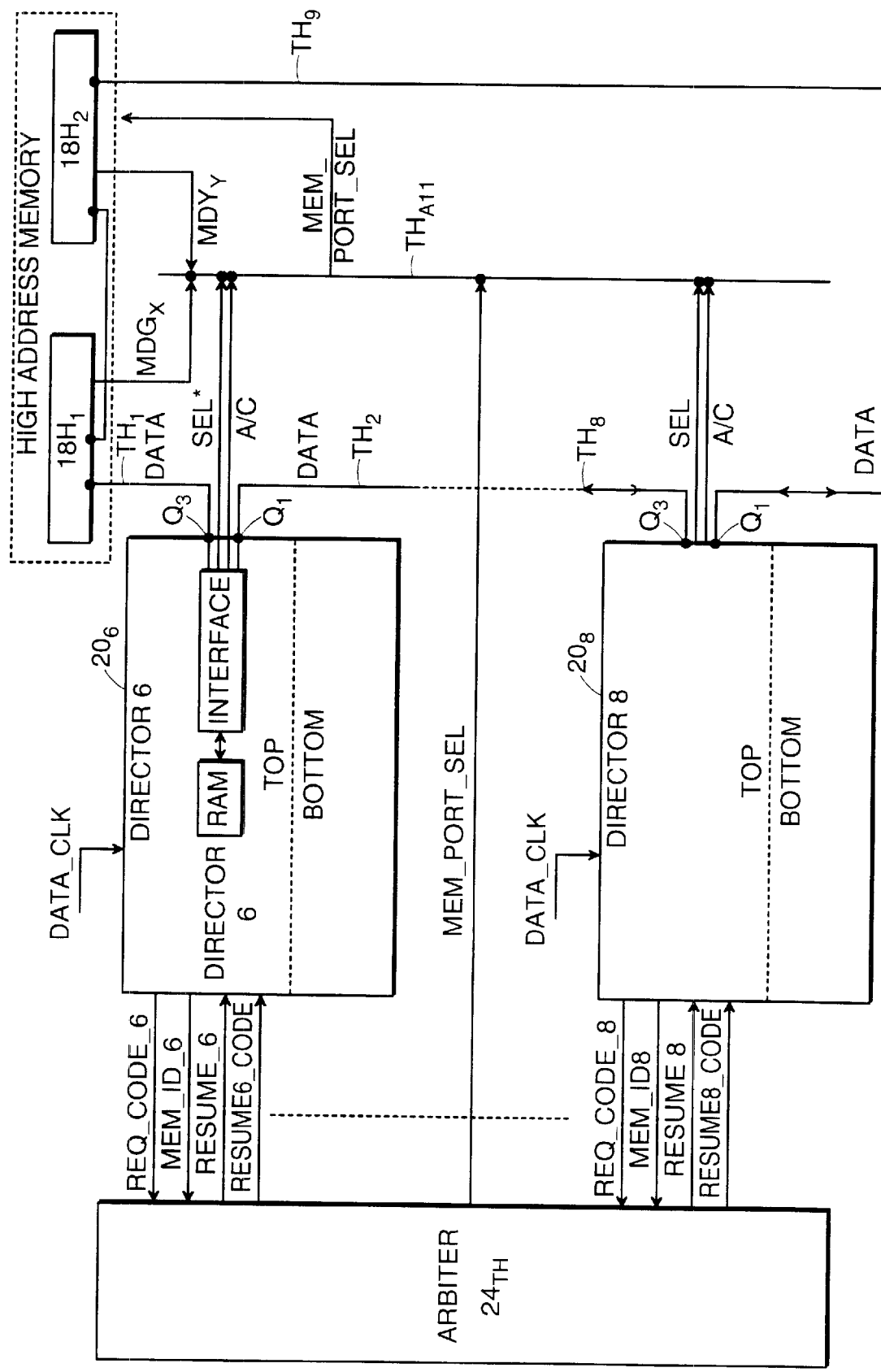
FIG. 6 is a block diagram showing control signal flow in the system of FIG. 1.
Figure 7:
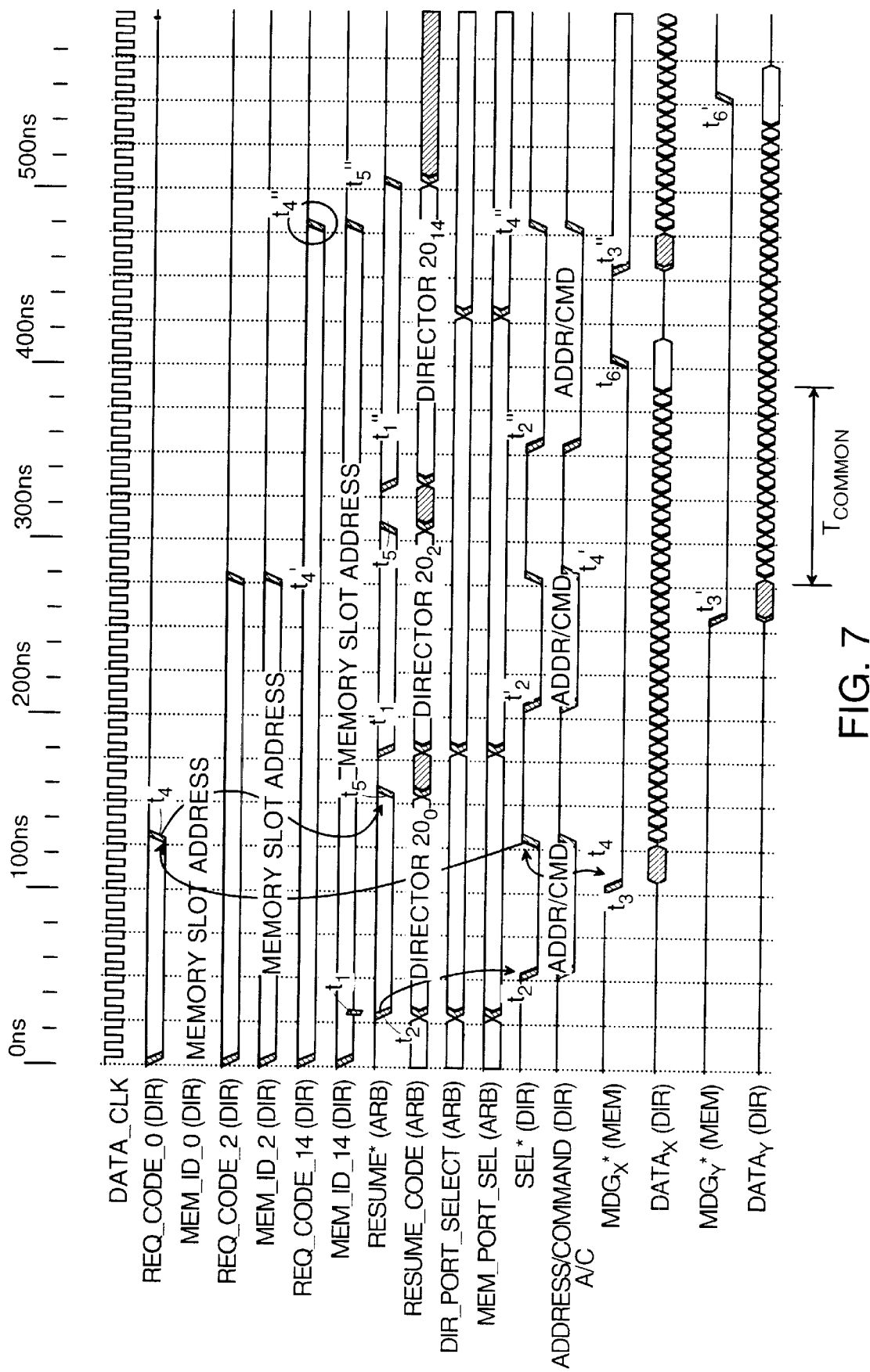
FIG. 7 is a timing diagram showing operation of one of four data loops in the system of FIG. 1.

More particularly, and referring to FIG. 6, one of the loops, here loop 31 (FIG. 2) is shown in more detail. Thus, access to the bus TH (i.e., the high address memory 18H) by the directors $20_0$–$20_8$ (only directors $20_6$ and $20_8$ being shown in FIG. 6) is controlled by the arbiter $24_{TH}$. Reference is also made to FIG. 7. Thus, in this example, at time t=0, directors $20_0$, $20_2$, and $20_{14}$ (FIG. 2) send requests for a data transfer to the arbiters $24_{TH}$, $24_{BL}$ via REQ_CODE_0, REQ_CODE_2, and REQ_CODE_14, respectively, and such directors $20_0$, $20_2$, and $20_{14}$ also request that such data be transferred to addresses specified in MEM_ID_0, MEM_ID_2, and MEM_ID_14, respectively, which are, in this example, all addresses in the high address memory 18H. In response to such requests, the arbiter $24_{TH}$ determines priority in accordance with a predetermined rule, such as that described in the TABLE above. From such TABLE, the arbiter $24_{TH}$ notes that two transfers are possible to the high address memory 18H; one from director $20_0$ to high address memory board 18H1 and another from director $20_{14}$ to high address memory board 18H2. Thus, here, in this example, the arbiter $24_{TH}$ issues, at time $t_1$: (a) a resume signal RESUME*; (b) a code to the director, here director $20_0$ being granted access to the data bus, here a RESUME_0 code; (c) a DIR_PORT_SEL determined from the TABLE above indicating to the directors $20_6$, $20_4$, $20_2$, $20_0$, $20_{14}$, $20_{12}$, $20_{10}$ and $20_8$, the control signals for the selectors $60_1$–$60_3$ therein to properly transfer data to the two boards 18H1 and 18H2; and, (d) a MEM_PORT_SEL for the selectors $60_1$–$60_3$ in the memories 18H1, 18H2, 18L1 and 18L2. Director $20_0$, in response thereto, asserts its select line SEL* at time $t_2$ with its address and command ADDRESS/COMMAND onto the bus $TH_{A/C}$. The memory being selected, here, in this example, memory 18H1, responds with a memory grant signal MDGX* on bus $TH_{A/C}$ at time $t_3$. Director $20_0$, in response to the memory grant signal MDGx* de-asserts its select line SEL* and its request code, here REQ_CODE 0 at time $t_4$. At time $t_4$ the transfer of data DATAX to memory 18H1 via segment $TH_4$ begins. As described above, the data passes to memory 18H1 in the following sequence: from port $Q_3$ of director $20_0$ to port $Q_1$ of director $20_2$ via segment $TH_4$; from port $Q_3$ of director $20_2$ to port $Q_1$ of director $20_4$ via segment $TH_3$; port $Q_3$ of director $20_4$ to port $Q_1$ of director $20_6$ via segment $TH_2$; and from port $Q_3$ of director $20_6$ to port $Q_1$ of memory 18H1 via segment $TH_1$ in response to DATA_CLK clock pulses, i.e., the clock pulses, CLK, described above.

The arbiter $24_{TH}$, in response to such de-assert signal at time $t_4$, removes the REQ_CODE_0 and, at time $t_5$ de-asserts the resume code RESUME*. At this point in time, $t_5$, the arbiter $24_{TH}$ is free to respond to a request from another one of the directors. As noted above, directors $20_2$ and $20_{14}$ are also requesting data transfers during time to. The arbiter $24_{TH}$ knows from the TABLE above that there is another path to high address memory 18H, that is the path from director $20_{14}$ to high address memory board 18H1 via segments $TH_7$, and $TH_8$. Thus, at time $t'_1$, the arbiter $24_{TH}$ issues: (a) a resume signal RESUME*; (b) a code to the director, here director $20_{14}$ being granted access to the data bus, here a RESUME_14 code; (c) the DIR_PORT_SEL determined from the TABLE above indicating to the selected directors the path the data is to be transferred through; and, (d) a MEM_PORT_SEL for the selectors $60_1$–$60_3$ in the memories 18H1, 18H2, 18L1 and 18L2. Director $20_{14}$, in response thereto, asserts its select line SEL* at time $t'_2$ with its address and command ADDRESS/COMMAND onto the bus $TH_{A/C}$. The memory being selected, here, in this example, memory 18H2, responds with a memory grant signal MDGy* on bus $TH_{A/C}$ at time $t'_3$. Director $20_{14}$, in response to the memory grant signal MDGy* de-asserts its select line SEL* and its request code, here REQ_CODE_14 at time $t'_4$. At time $t'_4$ the transfer of data DATAy to memory 18H2 via segment $TH_6$ begins. As described above, the data passes to memory 18H2 in the following sequence: from port $Q_1$ of director $20_{14}$ to port $Q_3$ of director $20_{12}$ via segment $TH_6$; from port $Q_1$ of director $20_{12}$ to port $Q_3$ of director $20_{10}$ via segment $TH_7$; port $Q_1$ of director $20_{10}$ to port $Q_3$ of director $20_8$ via segment $TH_8$; and from port $Q_1$ of director $20_8$ to port $Q_3$ of memory 18H2 via segment $TH_9$ in response to clock pulses, i.e., DATA_CLK), as described above.

The arbiter $24_{TH}$, in response to such de-assert signal at time $t'_4$, de-asserts the resume code RESUME* at time $t'_5$. At this point in time, $t'_5$, the arbiter $24_{TH}$ is free to respond to a request from another one of the directors, here from director $20_{14}$. As noted above, director $20_{14}$ is also requesting data transfers during time $t_0$. Thus at time $t''_1$, arbiter $24_{TH}$ issues: (a) a resume signal RESUME*; (b) a code to the director, here director $20_{14}$ being granted access to the data bus, here a RESUME_14 code; (c) the DIR_PORT_SEL determined from the TABLE above indicating to the selected directors that the path the data is to be transferred through and, (d) a MEM_PORT_SEL for the selectors $60_1$–$60_3$ in the memories 18H1, 18H2, 18L1 and 18L2. Director $20_{14}$, in response thereto, asserts its select line SEL* at time $t''_2$ with its address and command ADDRESS/COMMAND onto the bus $TH_{A/C}$. The memory being selected, here, in this example, memory 18H1, responds with a memory grant signal MDGy* on bus $TH_{A/C}$ at time $t''_3$, only after the data from director $20_0$ has been completely transferred to high address memory board 18H1, i.e., such transfer being completed at time $t_6$, as indicated. The transfer of data between director $20_{14}$ and the high address memory board 18H1 takes place in an manner similar to that taking place as described above in connection with the data transfer between director $20_0$ and memory board 18H1, albeit that there is one less director in the loop, i.e., director $20_0$. Finally it should be noted that data is being transferred to the high address memory section 18H concurrently during periods of time $T_{COMMON}$, as indicated; one to the board 18H1 and the other to board 18H2.

Other embodiments are within the spirit and scope of the appended claims.

What is claimed is:

1. A data storage system wherein a host computer is coupled to a bank of disk drives through a system interface, such system interface, comprising:
   a memory;
   a data loop, comprising:
      a bus, comprising a plurality of physically separated bus segments;
      a plurality of directors for controlling data transfer between the host computer and the bank of disk drives as such data passes through the memory via the plurality of bus segments of the bus, and
      wherein each one of the bus segments connects a pair of the plurality of directors in a daisy chain arrangement.

2. A data storage system wherein a host computer is coupled to a bank of disk drives through a system interface, such system interface, comprising:
   a memory;
   a bus, comprising a plurality of physically separated bus segments;
   a data loop comprising a plurality of directors in communication with the memory through the plurality of bus segments, such plurality of directors controlling data transfer between the host computer and the bank of disk drives as such data passes through the memory via the data loop, and
   wherein each one of the bus segments connects a pair of the plurality of directors in a daisy chain arrangement.

3. A data storage system wherein a host computer is coupled to a bank of disk drives through a system interface, such system interface, comprising:
   a memory having a high address memory section and a low address memory section;
   a pair of high address busses, comprising a plurality of bus high address bus segments, in communication with the high address memory section;
   a pair of low address busses, comprising a plurality of low address bus segments, in communication with the low address memory section; and
   a plurality of data loops, comprising a plurality of directors in communication with the memory through the plurality of high address and low address bus segments for controlling data transfer between the host computer and the bank of disk drives as such data passes through the memory as such data passes through the data loops.

4. A data storage system wherein a host computer is coupled to a bank of disk drives through a system interface, such system interface, comprising:
- a memory having a high address memory section and a low address memory section;
- a high address bus, comprising a plurality of bus high address bus segments, in communication with the high address memory section;
- a low address bus, comprising a plurality of low address bus segments, in communication with the low address memory section; and
- a pair of data loops, a first one of such pair of data loops comprising a first plurality of directors in communication with the memory through the plurality of high address bus segments for controlling data transfer between the host computer and the bank of disk drives as such data passes through the high address memory section and second plurality of directors in communication with the memory through the plurality of low address bus segments for controlling data transfer between the host computer and the bank of disk drives as such data passes through the low address memory section.

5. A data storage system wherein a host computer is coupled to a bank of disk drives through a system interface, such system interface, comprising:
- a memory having a high address memory section and a low address memory section;
- a plurality of directors for controlling data transfer between the host computer and the bank of disk drives as such data passes through the memory;
- a pair of high address busses, comprising a plurality of bus high address bus segments, in communication with the high address memory section;
- a pair of low address busses, comprising a plurality of low address bus segments, is in communication with the low address memory section; and
- wherein each one of the directors is in communication with one of the pair of high address busses and one of the pair of low address busses through one of the pair of high address busses and one of the pair of low address busses.

6. A data storage system wherein a host computer is coupled to a bank of disk drives through a system interface, such system interface, comprising:
- a memory;
- a plurality of directors for controlling data transfer between the host computer and the bank of disk drives as such data passes through the memory;
- a pair of high address busses, comprising a plurality of bus high address bus segments, in communication with the high address memory section;
- a pair of low address busses, comprising a plurality of low address bus segments, in communication with the low address memory section; and wherein
- each one of the directors being in communication with one of the pair of high address busses and one of the pair of low address busses.

7. A data storage system wherein a host computer is coupled to a bank of disk drives through a system interface, such system interface, comprising:
- a memory;
- a data loop, comprising:
  - a plurality of directors; and
  - a plurality of bus segments;
  - wherein the plurality of directors are serially coupled in a daisy chain arrangement to the memory through the plurality of bus segments; and
  - wherein such directors are configured to control data transfer between the host computer and the bank of disk drives as such data passes through the memory, and
  - wherein each one of the bus segments connects a pair of the plurality of directors.

8. A data storage system wherein a host computer is coupled to a bank of disk drives through an interface, such interface comprising:
- a printed circuit board, having a plurality of electrical connectors arranged in a linear array;
- a plurality of buses each one of the busses comprising a plurality of bus segments;
- a memory;
- a plurality of directors, such directors controlling data transfer between the host computer and the bank of disk drives as such data passes through the memory as such data passes through the bus segments; and wherein
  - each one of the segments is electrically connected to the busses, such electrical connectors being adapted to receive the directors and the memory and electrically interconnect the directors and memory received therein to the busses; and
  - wherein alternating ones of the directors are electrically connected to one pair of the busses and directors interleaved with such alternating ones of the directors are electrically connected to another pair of the busses.

9. A data storage system interface, such interface being coupled to a bank of disk drives, comprising:
- a memory;
- a plurality of directors;
- a data loop comprising a plurality of bus segments for serially coupling the plurality of directors to the memory in a daisy chain arrangement with pairs of the directors being connected by a corresponding one of the plurality of bus segments; and
- wherein the directors control data transfer with the bank of disk drives as such data passes through the memory via the plurality of bus segments and the concatenated arranged directors.

10. A data storage system interface, such interface being coupled to a bank of disk drives, comprising:
- a memory;
- a plurality of directors for controlling data transfer with the bank of disk drives;
- a data loop comprising a plurality of bus segments for serially coupling the plurality of directors to the memory in a daisy chain arrangement with pairs of the directors being connected by a corresponding one of the plurality of bus segments and with data in the data transfer serially passes through the memory via the plurality of bus segments and the concatenated arranged directors.

* * * * *